Nov. 23, 1954     J. S. HELLEN     2,694,942
BALL BEARING SCREW AND NUT
Filed March 8, 1951     2 Sheets-Sheet 1
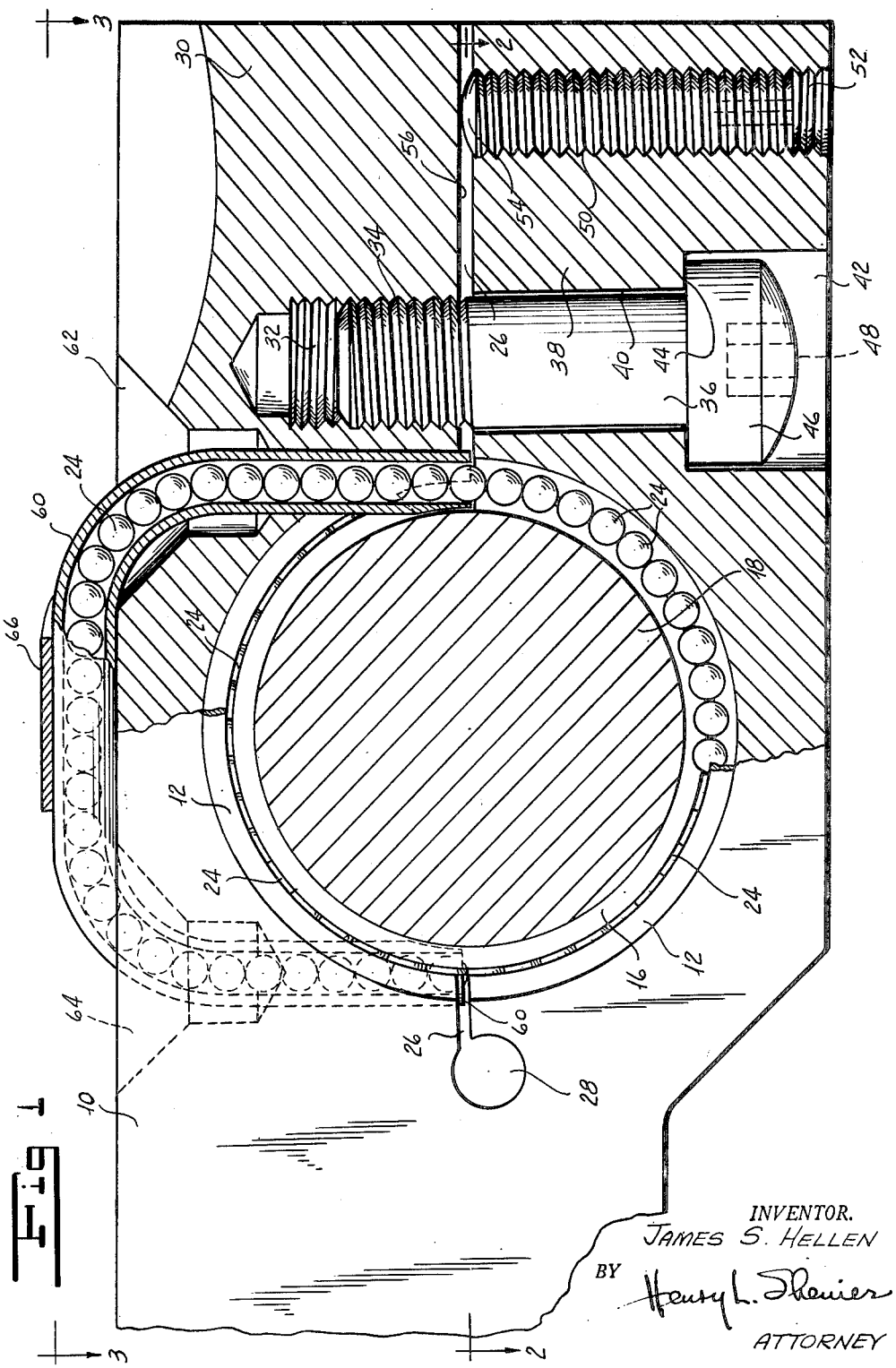
INVENTOR.
JAMES S. HELLEN
BY Henry L. Shenier
ATTORNEY Nov. 23, 1954 J. S. HELLEN 2,694,942
BALL BEARING SCREW AND NUT
Filed March 8, 1951 2 Sheets-Sheet 2
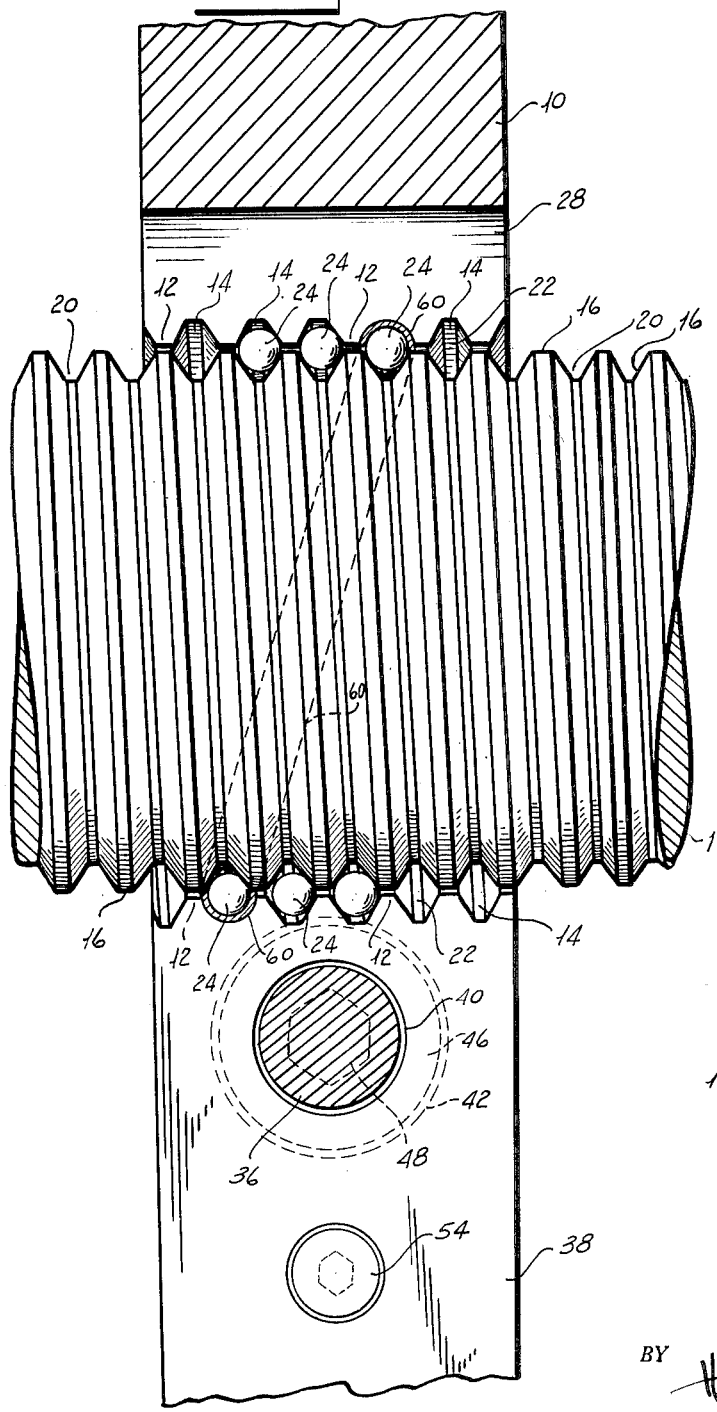
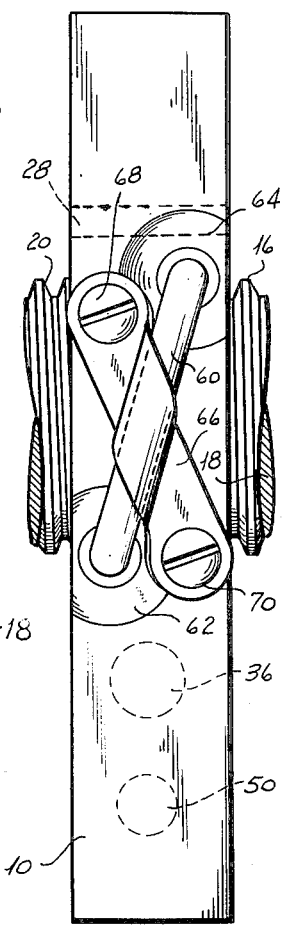
INVENTOR.
JAMES S. HELLEN
BY Henry L. Shenier
ATTORNEY United States Patent Office 2,694,942
Patented Nov. 23, 1954

2,694,942

BALL BEARING SCREW AND NUT

James S. Hellen, Locust Valley, N. Y., assignor to The Norden Laboratories Corporation, White Plains, N. Y., a corporation of Connecticut Application March 8, 1951, Serial No. 214,589

4 Claims. (Cl. 74—459)

My invention relates to an improvement in a ball bearing screw and nut of the type in which the screw and nut are provided with corresponding helical grooves forming a helical passage in which balls are lodged to constitute the screw thread connection between the screw and the nut, and in which a limited number of balls are recirculated through the helical passage by means of a transfer tube, and more particularly to a ball bearing screw and nut of this type in which there is no backlash and in which the balls from the helical passage may pass to and from the transfer tube with ease.

Ball bearing screw and nut assemblies in which there is an internal helical groove in both the screw and in the nut adapted to correspond to form a helical passage in which balls are lodged and in which balls are recirculated through the helical passageway by means of a transfer tube adapted to feed balls to and remove balls from the helical passageway are well known to the art. The balls roll on the relatively moving surfaces of the screw and nut, rubbing in opposite directions against each other as they move through the helical passageway, and against the sides of the transfer tube as they are pushed therethrough by succeeding balls. In the prior art it has been necessary to provide sufficient clearance in order to prevent the balls from jamming on the way from the transfer tube to the helical passage. If the clearance between the balls and the corresponding helical grooves is too small it has been found that the balls become jammed in the transfer tube due to the fact that they cannot pass readily from the tube into the helical groove, especially under load conditions. This condition becomes more marked not only with load conditions but also at higher speeds.

One object of my invention is to provide a ball bearing screw and nut assembly in which the backlash is substantially eliminated and in which, nevertheless, the balls may pass freely from the transfer tube to the helical passageway without jamming.

Another object of my invention is to provide a ball bearing screw and nut which may be operated under load conditions and at high speeds without jamming of the balls in passing from the transfer tube to the helical passageway.

Another object of my invention is to provide a ball bearing screw and nut having no backlash, but having a slight degree of freedom between the screw and the nut along an axis perpendicular to the axis of the screw in order to eliminate critical mounting of the nut.

Other and further objects of my invention will appear from the following description.

In general my invention contemplates the provision of a ball bearing screw and nut in which the helical grooves of the nut are formed substantially along the surface of a cylinder having an elliptical cross section. The minor axis of the ellipse is such that it will give substantially no clearance for the balls in the helical passage formed by the helical groove of the screw and the nut. The major axis of the ellipse is such that the balls will pass through the helical passage adjacent the major axis of the ellipse freely. The transfer tube terminals communicate with the helical passage adjacent the major axis of the ellipse. In this region the balls have considerable clearance with the walls of the helical passage formed by the grooves of the nut and the screw so that substantially no resistance is offered to the passage of balls from the tube into the helical passageway. It is to be understood, of course, that the cross-sectional shape of the screw is circular. The use of a circular cross-sectional screw and an elliptical cross-sectional nut forms the helical passageway for the balls having the desired configuration to produce the results I desire.

The elliptical cross-sectional shape for the helical groove of the nut is approximated by means of splitting the nut along a plane passing through the axis of rotation of the screw, metal being removed along this surface adjacent one side of the nut. Means are provided for bringing the free ends of the split portion together. The helical groove of the nut normally lies along the locus of a circular cylinder and is such that it is slightly oversize. The bringing together of the free ends of the slot forces the helical groove of the nut to lie substantially along the surface of an elliptical cylinder. The adjustment is made until all backlash is eliminated by the close contact of the balls adjacent the minor axis of the ellipse with the sides of the grooves of the nut and screw which form the helical passageway. If desired, the balls in this area can be designed to have a slight preload to be sure all backlash is eliminated. Even though this condition exists adjacent the minor axis of the ellipse, there will still be sufficient clearance adjacent the major axis of the ellipse at the point of communication with the transfer tube so the balls can pass freely from and to the transfer tube to the helical passsageway. At the same time the screw will be allowed a slight angular freedom axially thereof in the plane of the major axis of the ellipse which removes the necessity for a critical mounting of the nut.

In the accompanying drawings which form part of the instant specification and which are to be read in conjunction therewith and in which like reference numerals are used to indicate like parts in the various views:

Figure 1 is an end view of my ball bearing screw and nut assembly with parts broken away and parts in section.

Figure 2 is a sectional view taken along the plane 2—2 of Figure 1.

Figure 3 is a top plan view of my ball bearing and nut assembly drawn on a smaller scale viewed along the plane 3—3 of Figure 1.

More particularly, referring now to the drawings, the nut 10 may have any suitable form and is provided with an internal helical screw thread 12 forming a helical groove 14. This groove normally lies along a diameter of a circular cylinder slightly larger than that which would normally be employed to form a helical passageway with the threads 16 of a screw 18. The thread 16 defines a helical groove 20 the lands of which groove lie along the surface of a circular cylinder. The helical groove 20 of the screw and the helical groove 14 of the nut form a helical passageway 22 in which balls 24 are positioned through a plurality of predetermined turns of this helical passageway. The nut 10 is formed with a slot 26 which is obtained by removing metal through one side of the nut along a plane in the vicinity of the axis of rotation of the screw 18. The slot extends from one side of the nut through the threads 12 of the nut and terminates in an axially extending opening 28 formed in the nut parallel to the axis of the screw. The upper free end 30 of the nut is formed with an internally threaded opening 32 in which is lodged the threaded end 34 of a bolt 36. The lower free end of the nut 38 is formed with a passage 40 and a recess 42 which is formed with a shoulder 44. The shank of the bolt 36 is adapted to extend through the passage 40 and the head 46 of the bolt seats against the shoulder 44. As the bolt is rotated by means of a socket 48 formed in the head it will draw the free ends 30 and 38 of the nut together, giving the helical groove of the nut the desired elliptical cross-sectional shape with the minor axis normal to the plane of the slot 26 and the major axis of the ellipse lying substantially along the plane of the slot. In order to maintain the adjustment of the bolt 36, a stop screw 50 is threadedly positioned in a threaded bore 52 formed in the lower free end of the nut 38. The end 54 of this screw is adapted to abut the lower surface 56 of the upper free end 30 of the nut. In this manner, as the bolt 36 is tightened, the upper free end 30 will be positioned with respect to the lower free end 38 as determined by the screw 50. This enables me to obtain an accurate adjustment of the helical passageway and to maintain the adjustment after it has been made.

Since the balls rub against each other, as well as the passageway, I desire, in order to reduce friction, to employ a limited number of helical turns comprising the passageway filled with balls. In the drawings I have shown the positioning of a transfer tube 60 such that two and one-half turns of the helical passageway are filled with balls, the transfer tube forming the half turn to complete the closed circuit through which the balls travel. The position of the transfer tube is indicated in dotted lines in Figure 2. The upper portion of the nut is formed with a pair of funnel-shaped recesses 62 and 64 communicating with vertically extending bores formed in the upper portion of the nut extending vertically downwardly into the slot portion 26. The transfer tube 60 is held in position by means of a plate 66 secured to the nut by means of tap screws 68 and 70, as can readily be seen by reference to Figure 3. The funnel-shaped openings 62 and 64 accommodate for the curvature of the transfer tube 60 so that it may have a substantially U-shaped form. The lower ends of the transfer tube are shaped to accommodate the helical threads of the screw so that they will lie closely adjacent thereto in a manner to permit the vertical axis of the transfer tube to be substantially tangent to the pitch diameter of the assembly.

In use the helical passageway and transfer tube are filled with balls and the bolt 36 and the screw 50 so adjusted as to remove all backlash between the bolt and nut. In a typical case I used balls having a uniformity, one with the other, of .000025 inch and was enabled to produce an assembly having no backlash and which worked so freely that I was enabled to drive the screw by pushing on the nut, even though the pitch of the helical passageway was only two and one-quarter degrees.

As can be seen by reference to Figure 2, if the screw 18 is rotated in a clockwise direction as viewed from the right, the screw will advance to the left if the nut is held stationary. In this rotation the balls in the upper portion of Figure 2 will all be moving downwardly and the balls in the lower portion of Figure 2 will all be moving upwardly, that is, traveling around the helical groove agreeable to the rotation of the screw 18. The balls will be traveling upwardly through the transfer tube 60, as viewed in Figure 2. If the screw 18 is rotated in the opposite direction, that is, in a counterclockwise direction as viewed from the right in Figure 2, the balls in the upper portion of Figure 2 will all be traveling upwardly and those in the lower portion of Figure 2 will be traveling downwardly and the balls will be moving through the transfer tube 60 from the upper portion in Figure 2 to the lower portion. A single ball will travel around the spiral passageway two and one-half turns of the screw in either direction in moving from one end of the transfer tube to the other end of the transfer tube in the construction shown in the drawings. It is to be understood, of course, that the transfer tube may be made to embrace a larger number of turns, if desired.

It will be seen that I have accomplished the objects of my invention. I have provided a ball bearing screw and nut assembly in which the balls pass freely to and from the transfer tube to the helical passageway without jamming. I eliminate backlash in a ball bearing nut and screw. I may operate my ball bearing nut and screw under load conditions and at high speed without jamming the balls. I provide a nut and screw assembly having no backlash, but which nevertheless has a slight degree of freedom between the screw and the nut along an axis perpendicular to the screw in one plane in order to eliminate critical mounting of the nut.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A ball bearing screw and nut including in combination a screw of circular cross section formed with a helical groove, a nut having a bore of substantially elliptical cross section formed with an internal helical groove, the helical groove of the screw and the helical groove of the nut being positioned with respect to each other to form a helical passageway, a plurality of balls lodged in the helical passageway in contact with each other and forming connection between the screw and nut, a transfer duct carried by the nut and positioned to provide communication between a point in the helical passageway adjacent the major axis of the substantially elliptical bore of the nut and another point in the helical passageway axially displaced from the first point and adjacent the major axis of the substantially elliptical bore of the nut, and balls positioned in the transfer duct, the construction being such that backlash is substantially eliminated and the balls pass freely from said helical passageway to said transfer duct.

2. A ball bearing screw and nut as in claim 1, in which the nut comprises a bifurcated body member, the plane of bifurcation extending through the axis of the nut bore, and means for drawing the free ends of the body member together to lengthen the major axis of the cross-sectional ellipse of the bore with respect to the minor axis.

3. A ball bearing screw and nut as in claim 1, in which the nut comprises a bifurcated body member having a pair of free ends lying on opposite sides of the plane of bifurcation, the plane of bifurcation extending through the axis of the nut bore, the nut bore being formed with a circular cross-sectional shape, and means for drawing the free ends of the body member together to give the nut bore a substantially elliptical cross-sectional shape with the major axis lying adjacent the plane of bifurcation.

4. A ball bearing screw and nut as in claim 1, in which the nut comprises a bifurcated body member with the plane of bifurcation extending through the axis of the nut bore, a pair of vertically extending bores formed in the nut in one of the bifurcations providing communication between a surface of the nut and the interbifurcation space, one of said vertical bores being positioned diametrically opposite from the other vertically extending bore and being axially displaced therefrom, said transfer duct comprising a substantially U-shaped tube having its legs extending through said vertical bores.

References Cited in the file of this patent

UNITED STATES PATENTS

| Number | Name | Date |
|---|---|---|
| 476,304 | Pratt | June 7, 1892 |
| 888,619 | Kelly | May 26, 1908 |
| 2,350,538 | Selnes | June 6, 1944 |
| 2,473,743 | Barnes | June 21, 1949 |
| 2,505,131 | Means, Jr. | Apr. 25, 1950 |